Oct. 20, 1964                P. E. GIES ETAL                3,153,373
                   MOUNTING FOR HYDRAULIC ROTARY ACTUATOR
                            Filed Aug. 21, 1962

INVENTORS
Paul E. Gies
BY Emmett C. Manning

ATTORNEYS

United States Patent Office 3,153,373
Patented Oct. 20, 1964

3,153,373
MOUNTING FOR HYDRAULIC ROTARY
ACTUATOR
Paul E. Gies, Snyder, and Emmett C. Manning, Lockport, N.Y., assignors to Houdaille Industries, Inc., Buffalo, N.Y., a corporation of Michigan
Filed Aug. 21, 1962, Ser. No. 218,403
8 Claims. (Cl. 92—121)

The present invention relates to an improved mounting for hydraulic rotary actuators, and more particularly concerns a new and improved arrangement for relieving rotary actuators from the damaging effects of high bending stresses under heavy loads.

In many service applications for rotary actuators, fixed mounting of the actuators subjects the actuator shaft to detrimentally heavy side loads resulting in high bending stresses in the shaft and high loads on the actuator bearings. This is especially true where the equipment with which the actuator is associated gets rugged use and tends to flex and wear rapidly, which makes it difficult to keep mounting alignment true. For example, in earth moving equipment, such as in a backhoe, the pivot mast to which the boom and scoop are attached is subject to flexure which is transmitted to the actuator shaft and bearings of the rotary actuator. Moreover, in such equipment bearings tend to become loose or worn so that the driven shafting tends to rotate eccentrically in a manner to transmit the load to the rotary actuator.

The present invention overcomes the prior difficulties by substantially isolating the rotary actuator from external bending and side loads by mounting it in a manner to float freely in any direction, yet holding it against rotation of the actuator housing.

An important object of the present invention is to provide a new and improved mounting for hydraulic rotary actuators to protect the actuator shaft from undesirable bending stresses and to protect the actuator bearings from undue or eccentric loads.

Another object of the invention is to provide a new and improved mounting for hydraulic rotary actuators which simplifies attaching or detaching of the actuator.

A further object of the invention is to provide a new and improved hydraulic rotary actuator arrangement and mounting whereby hydraulic unbalance is substantially cancelled whereby to reduce the net load on the actuator bearings.

Figure 1:
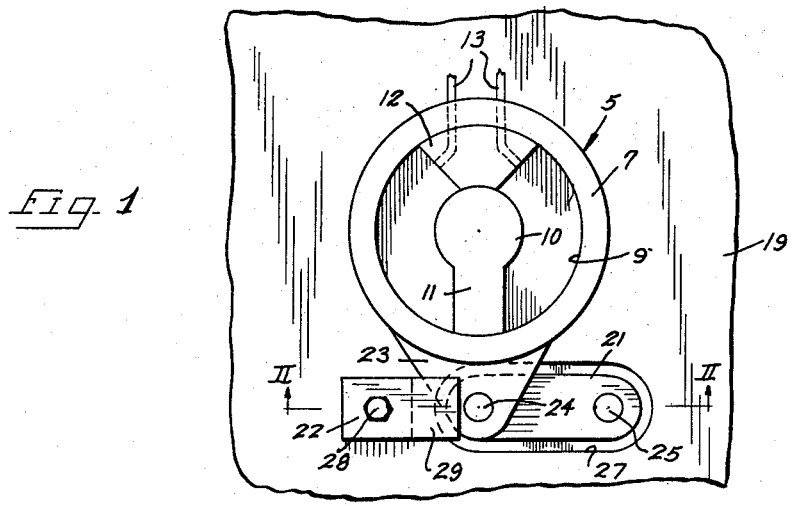
Figure 2:
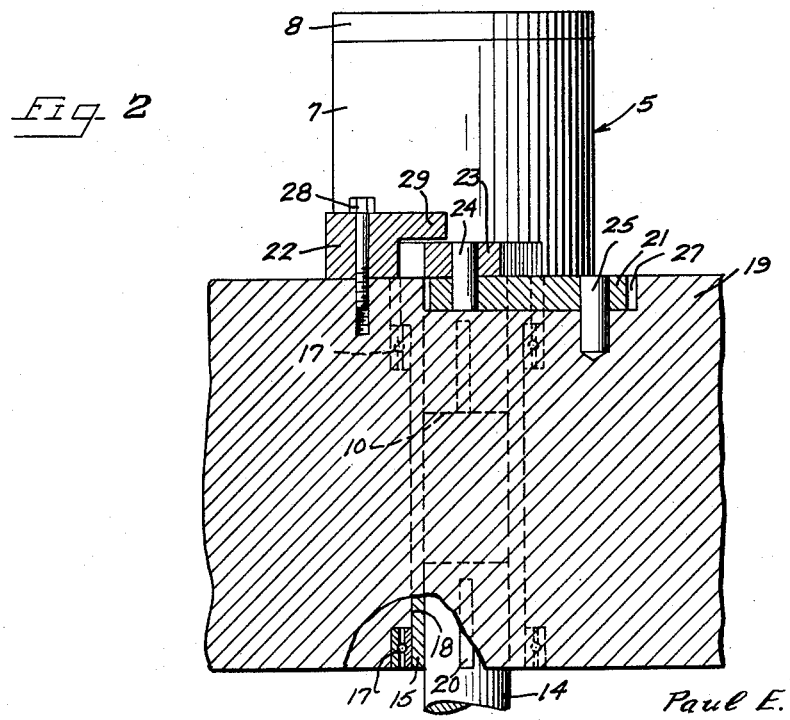

Other objects, features and advantages of the present invention will be readily apparent from the following detailed description of a preferred embodiment thereof taken in conjunction with the acompanying drawings, in which:

FIGURE 1 is a more or less schematic view of a rotary hydraulic actuator and improved means for mounting the same according to the present invention; and FIGURE 2 is a sectional elevational detail view taken substantially on the line II—II of FIGURE 1.

In the drawing, a hydraulic rotary actuator 5, generally representative of this well-known type of actuator, has as its essential components a housing 7, shown open at one end in FIGURE 1 and closed by a cover 8 in FIGURE 2, defining therein a cylindrical working chamber 9 within which a wing shaft 10 is rotatably axially disposed and has a wing or vane 11 extending radially and cooperating with an abutment 12 in the chamber to divide the chamber into two working sub-chambers. Hydraulic fluid is driven by suitable pumping or other hydraulic fluid driving means under pressure into either of the sub-chambers selectively through respective conduits or ducts 13 while the other of such ducts serves as a fluid exhaust, all under the control of suitable means including valving, etc., as preferred or as is well-known in the art. In FIGURE 1, the vane 11 is shown at mid-position, and it will be understood that when hydraulic fluid under pressure is delivered by the appropriate duct 13 into the left-hand sub-chamber, the vane 11 will swing to the right and rotate the wing shaft 10 counterclockwise to the limit permitted by the abutment 12. Conversely, pressure fluid admitted into the right-hand sub-chamber swings the vane 11 toward the left and drives the wing shaft 10 clockwise. While in this instance a single vane wing shaft is disclosed, it is conventional to provide double vane wing shafts, if desired or necessary.

Driving of the wing shaft 10 actuates a driven member of associated equipment such as a shaft 14 to which the wing shaft 10 is suitably coupled, and in the illustrated example, in generally axial alignment. For example, the end of the wing shaft 10 that projects from the housing 10 may, as shown in FIGURE 2, be splined or keyed into a coupling stub shaft 15 journalled adjacent its opposite ends in respective bearings 17 within a suitable bore 18 of a supporting frame structure 19 of the associated apparatus. In this instance, the driven shaft 14 is splined or keyed as by a key 20 into the opposite end of the coupling shaft 15.

In a practical use, the driven shaft 14 may be part of the actuating mechanism for an earth moving machine such as a backhoe in which the shaft 14 is in the pivot mast assembly to which the boom and scoop are attached. In such apparatus, while digging, the mast flexes and bearings tend to wear and become loose. As a result, during swinging of the loaded boom the mast tends to rotate eccentrically, especially at its upper bearing. As will be apparent, such tendency toward loading eccentricity in operation will be transmitted to the actuator 5 through coupling of the wing shaft 10 with the driven shaft 14. Where the actuator is rigidly secured to the supporting frame 19 the heavy side loads imposed by the tendency toward eccentricity results in high bending stresses in the wing shaft and high loads on the actuator bearings.

According to the present invention, mounting of the actuator 5 on the support 19 is effected in a manner which isolates the actuator from external bending and side loads by permitting the actuator to, in effect, float freely in any direction, within practical limits, yet holding it against rotation relative to the supporting frame. This is accomplished in a simple, practical manner by securing the actuator case or housing 7 to means in the form of a link 21 which is suitably anchored to the supporting frame 19 to hold the actuator substantially against rotation relative to the supporting frame, while means in the form of a retaining bracket or clamp 22 retains the actuator against undesirable axial displacement relative to the supporting frame 19.

In a practical arrangement, means for connecting the actuator housing 7 to the link 21 comprise a radially projecting ear or lug 23 on the housing and desirably adjacent to the end of the housing which opposes the supporting frame 19. This attachment lug 23 overlies one end portion of the link 21 and is pivotally connected to the link as by means of a pin 24. Assembly of the actuator with the link 21 is facilitated by having a slip fit on at least one end portion of the pin 24.

At its opposite end portion, substantially spaced from the pin 24 and thus from the attachment lug 23, the link 21 is pivotally attached to the supporting frame 19 by means such as a pin 25 which, for ease in assembly may have at least one of its end portions provided with a slip fit. Conveniently, and for compactness of the assembled relationship, the link 21 is mounted within a clearance recess 27 in the supporting frame member 19.

Through this arrangement, tolerance for radial movements of the actuator 5 is afforded to compensate for the external bending and side loads which tend to effect radial displacements permitted by the flexibilities or loosenesses in the apparatus and more particularly the bearings 17. Where the load requirements of the equipment require it, a double shear relationship can be accommodated by a clevis arrangement at the pins 24 and 25.

Although only one of the retaining clamps 22 is shown, a plurality of such retaining or tie-down clamps may be used. This clamp is attached to the supporting frame 19 adjacent to the attachment lug 23 as by means of a bolt 28, and on the opposite side to that from which the link 21 extends substantially normal to a diameter of the actuator chamber 9 through the lug, in a manner to be free from the actuator housing as well as the link 21 and the lug 23. Herein the body of the clamp 22 is secured firmly to the frame member 19, and a retaining lug flange 29 overlies the attachment lug 23 slightly spaced clearance relations. This clearance between the clamp flange 29 and the lug 23 permits the actuator 5 to have slight angular misalignments and free movements radially in mounting and in service in cooperation with the linkage connection of the lug 23 to the supporting frame member 19. Removal of the clamp 22 enables the actuator 5 to be lifted away from the shaft connection and the support 19 when desired.

As a result of the mounting of the actuator 5 as described, it is substantially free floating within sufficient limits to avoid transmission thereto of damaging eccentric loads in the operation of the shaft 14. A further advantage of the so-to-speak floating mounting of the actuator 5 is that manufacturing tolerances may be liberal for manufacturing economy. For example, the hole location for the pins 24 and 25 need not be especially accurate. Neither is there a critical spacing between the retaining clamp flange 29 and the lug 23, but merely a desirably close but free spaced relation.

The particular arrangement shown in FIGURE 1 wherein the abutment 12 is located diametrically opposite the attachment lug 23 is quite desirable in effecting an advantageous balance of forces. Thus, the force on the actuator bearing in the housing due to hydraulic unbalance in either of the sub-chambers acts substantially parallel to the link 21. Force on the link 21 through the actuator lug 23 produces a couple force opposing and cancelling out at least a part of the unbalancing force of pressurization, that is vane actuation in the actuator. As a result, bearing loads in the actuator 5 tend to stay more constant and at a lower maximum level than with other types of mounting for a single vane actuator.

It will be understood that modifications and variations may be effected without departing from the scope of the novel concepts of the present invention.

We claim as our invention:

1. In apparatus including a supporting structure and a shaft rotatably mounted on said supporting structure and subject to eccentric loading in service,
    a hydraulic rotary actuator having a shaft generally axially aligned with and coupled to said shaft to effect operative rotation of the shaft,
    and means mounting said actuator on said supporting structure in a substantially floating relation and including means retaining the actuator substantially against rotation relative to the supporting structure but permitting shaft loading-eccentricity-imposed generally radial movements of the actuator and means retaining the actuator against any substantial displacement axially of the orientation with respect to said shaft and relative to the supporting structure but permitting said shaft imposed loading movements of the actuator.

2. In apparatus including a supporting member,
    a stub shaft journalled in said supporting member,
    a driven shaft drivingly connected to said stub shaft,
    and a hydraulic rotary actuator connected to said stub shaft for rotatably driving the stub shaft and thereby the driven shaft,
    means for mounting the actuator in substantially floating relation on the supporting member, including:
        a lug projecting from the actuator,
        a link pivotally attached to the supporting member and pivotally connected to said lug and retaining the actuator substantially against rotation relative to the supporting member,
        and a clamp mounted on the supporting member and having a flange overlying the lug in slightly spaced relation and thereby retaining the actuator against any substantial displacement axially relative to the supporting member but permitting desirable floating movements of the actuator as imposed by loading eccentricities in said shaft.

3. In means for substantially floatingly mounting a hydraulic rotary actuator on a supporting structure,
    the actuator including a housing having a lug projecting therefrom,
    a link connected to said lug and having means for attaching the link to the supporting structure,
    and a clamp free from the lug and the link and arranged to be mounted fixedly on the supporting structure and having means coactive with the lug to retain the actuator against undesirable axial displacement while permitting relative floating displacements of the actuator as imposed by loading eccentricities on an associated driven shaft.

4. In apparatus including a supporting structure and a hydraulic rotary actuator having a shaft coupled in substantially axial alignment to a shaft to be driven rotatably thereby,
    the driven shaft being subject to loading eccentricities in service,
    means for substantially floatingly attaching the actuator to the supporting structure including:
        a lug projecting from the actuator and overlying the supporting structure,
        and a link connected at one end to the supporting structure and at the opposite end connected to the lug.

5. In apparatus including a supporting structure and a hydraulic rotary actuator having a shaft coupled in substantially axial alignment to a shaft to be driven rotatably thereby,
    the driven shaft being subject to loading eccentricities in service,
    means for substantially floatingly attaching the actuator to the supporting structure including:
        a lug projecting from the actuator and overlying the supporting structure,
        a link connected at one end to the supporting structure and at the opposite end connected to the lug,
        and a clamp mounted on the supporting structure free from the lug and the link and having a portion overlying and retainingly coacting with said lug in such clearance relation thereto as to permit desirable floating movements of the actuator as imposed by loading eccentricities of the driven shaft but preventing any substantial displacement axially as related to the shafts and relative to the supporting structure.

6. Apparatus as defined in claim 5, wherein said link is disposed on one side of said lug and said clamp opposes the opposite side of said lug.

7. Apparatus as defined in claim 6, further characterized in that the supporting structure has a clearance recess within which the link is mounted.

8. In apparatus including a supporting structure,
    a hydraulic rotary actuator comprising a housing defining a pressure chamber therein and having an abutment fixed in the pressure chamber and a wing shaft rotatable in the housing with a vane cooperatively oscillatable with the wing shaft between opposite sides of said abutment,
a driven shaft,
means coupling the driven shaft in generally coaxial alignment with the wing shaft to be driven thereby,
a lug on the outside of said housing diametrically opposite to said abutment,
the actuator housing being free from any direct connection to said supporting structure,
a member free from the housing but mounted on the supporting structure and having a portion confining said lug in a limited space between such portion and the supporting structure whereby to permit desirable floating movements of the actuator as imposed by loading eccentricities in said driven shaft but retaining the actuator against any substantial axial displacement relative to the supporting structure,
and a link connected at one end to said lug and at its opposite end to the supporting structure and retaining the actuator housing against any substantial rotation relative to the supporting structure.

References Cited in the file of this patent

UNITED STATES PATENTS

| | | |
|---|---|---|
| 2,194,374 | Wunsch | Mar. 19, 1940 |
| 2,511,501 | Floraday | June 13, 1950 |

FOREIGN PATENTS

| | | |
|---|---|---|
| 27,179 | Great Britain | Dec. 23, 1898 |